United States Patent Office 3,409,615
Patented Nov. 5, 1968

3,409,615
PROCESS FOR THE PREPARATION OF
1:3-BENZOXAZINE-2:4-DIONES
John William James and James Albert Baker, Slough, and John Dixon Shrive, Wokingham, England, assignors to Aspro-Nicholas Limited, London, England, a British company
No Drawing. Filed Oct. 1, 1965, Ser. No. 492,324
Claims priority, application Great Britain, Oct. 1, 1964, 40,068/64
18 Claims. (Cl. 260—244)

ABSTRACT OF THE DISCLOSURE

A process is provided for the preparation of 1:3-benzoxazine-2:4-diones by adding a lower alkyl ester of chloroformic acid to an aqueous medium comprising water, the corresponding salicylamide, and an inorganic base in an amount to bring the pH to above about 8, and holding the reaction mixture at a temperature at which reaction proceeds to form the 1:3-benzoxazine-2:4-dione.

---

This invention relates to a process for the preparation of 1:3-benzoxazine-2:4-dione. This compound has pharmacological activity as described in British Patent No. 950,065, and in U.S. patent application Ser. No. 125,647, filed July 21, 1961, in the name of Leslie Frederick Wiggins.

1:3-benzoxazine-2:4-dione, otherwise called 2:4-dioxodihydro-5:6-benzo-1:3-oxazine or carbonylsalicylamide, is a known compound having the structural formula:

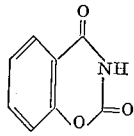

A number of procedures for the preparation of this compound are described in the literature. Beilstein, System No. 4298, page 262, indicates that it can be obtained in moderate yield by long heating of salicylic acid with urea at 222° C. The compound is formed together with phenol and cyanuric acid (Einhorn and Schmidlin, Berichte, 35, 3656). It is also formed in moderate yield along with much salicylic acid nitrile from salicylamide by the reaction of phosgene in pyridine or dilute sodium hydroxide solution with cooling (Einhorn and Mettler, Berichte, 35, 3649). It is also formed in good yield, according to Mettler, by the reaction of chloroformic acid ethyl ester with salicylamide in pyridine, first, with cooling, and then at the end by heating on the water bath (Einhorn and Mettler, Berichte, 35, 3649). It is also formed in moderate yield, together with other products, by the heating of salicylamide with chloroformic acid ethyl ester, diphenyl carbonate, phenyl isocyanate or urea (Einhorn and Schmidlin, Berichte, 35, 3656), and by heating o-carboethoxysalicylamide at 100° C. or by heating with water (Bogisch, Chem. Zeitung, 13, 1078) or by the heating of o-aminoformylsalicylamide at 186° C. or by treating N-acetyl-O-N-carbonylsalicylamide with water or by heating with alcohol. When salicylamide is reacted with a chloroformic acid ester, an intermediate o-carboethoxysalicylamide is formed which on heating to 100° C. undergoes ring closure to form the 1:3-benzoxazine-2:4-dione, in accordance with the procedure described by Bogisch.

Comanducci in Rend. accad. sci. Napoli (iii) 27, 48–52 (1921) describes its preparation by the reaction of urethan (ethyl carbamate) and acetylsalicylic acid (aspirin). These two substances were heated to fusion, whereupon they reacted to form carbonyl salicylamide, salicylamide, salicylic acid nitrile, and a polymer of the nitrile of o-amidobenzoic acid, together with ammonia, carbon dioxide, and small amounts of phenol. Shapiro et al., J. Am. Chem. Soc., 79, 2811–2814 (1957) describes the preparation of a number of 1:3-benzoxazine-2:4-dione derivatives by reaction of the corresponding salicylamide in pyridine with acetonitrile and ethyl chlorocarbonate, concentrating the solution and then refluxing it at elevated temperature until the product is formed.

Adaptation of these procedures for the commercial preparation of 1:3-benzoxazine-2:4-dione has proved difficult. Processes requiring organic solvents such as pyridine or acetonitrile are unsatisfactory because of the necessity of solvent recovery and recycling, and this is prohibitive when the solvents are expensive or toxic, because there are invariably some losses and some difficulties involved in ridding products of residual traces of toxic solvents. Furthermore, the reaction of salicylamide with esters of chloroformic acid usually results in the formation of a sticky, semi-solid product which is difficult to process, requiring several separate purification procedures, all of which are mechanically difficult, due to the physical state of the reaction product.

In accordance with the present invention, there is provided a process for the preparation of 1:3-benzoxazine-2:4-dione and derivatives thereof in good yield, by reaction of the corresponding salicylamide with a lower alkyl ester of chloroformic acid. The reaction is carried out in an aqueous basic medium at a pH above about 8, and at a moderate temperature. Careful control of the reaction conditions as herein described facilitates formation of a solid crystalline product.

The reaction proceeds as follows:

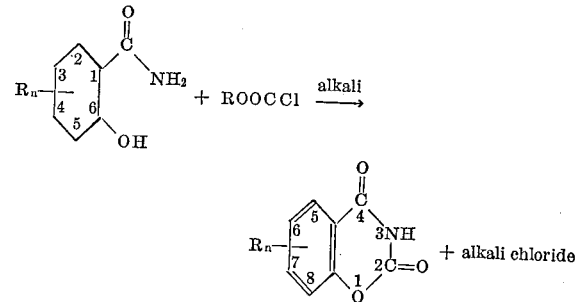

The invention is applicable to any benzoxazine dione having the general formula:

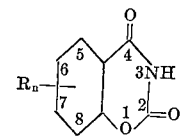

In the above formula, R can be halogen, such as chlorine, fluorine or bromine, lower alkoxy and lower alkyl having from one to about six carbon atoms, for example, methyl, ethyl, isoamyl, t-butyl, methoxy, ethoxy, propoxy, isopropyl, n-hexoxy, n-hexyl, isobutyl, aryl or mixed alkyl aryl having from six to about ten carbon atoms, such as phenyl, naphthyl, xylyl, tolyl, butyl phenyl, ethyl phenyl, phenethyl and benzyl, and cycloalkyl having from five to seven carbon atoms, such as cyclohexyl, cyclopentyl, or cycloheptyl. R radicals are usually in the 6- or 8-position.

n is an integer representing the number of R radicals, and has a value from zero to 4.

Any lower alkyl ester of chloroformic acid can be employed. By the term "lower alkyl" is meant any alkyl radical having from one to about six carbon atoms. Exemplary are methylchloroformate, ethylchloroformate, propylchloroformate, isopropylchloroformate, n-butylchloroformate, isobutylchloroformate, tertiarybutylchloroformate, secondarybutylchloroformate, n-amylchloroformate, isoamylchloroformate, tertiaryamylchloroformate, n-hexylchloroformate, isohexylchloroformate, secondary-hexylchloroformate, and neopentylchloroformate.

The process in accordance with the invention can be carried out in water as the reaction medium. The 1:3-benzoxazine-2:4-dione is insoluble in water, and is readily separated therefrom at the conclusion of the reaction by conventional separation techniques, such as filtration or centrifuging.

Although water is a completely satisfactory reaction medium, it is also possible to employ aqueous reaction media including water-miscible inert neutral organic solvents, such as the lower alkanols, for example, methanol, ethanol, isopropanol and n-propanol, ketones, for example, acetone and methyl ethyl ketone, and dioxane. Such a reaction medium can, if desired, be diluted with water at the conclusion of the reaction, to ensure separation of any dissolved reaction product, 1:3-benzoxazine-2:4-dione.

The reaction will proceed at room temperature. A moderately elevated temperature will, however, increase the rate of reaction, which may otherwise be rather slow. At temperatures above 70° C., there may be some discoloration and/or decomposition of the reaction product. Hence, temperatures up to 70° C. normally can be employed without disadvantage. The upper limit is set only by the decomposition temperature of the reaction product, however. Thus, the reaction temperature may suitably lie within the range from about 20 to about 70° C. or above, and is preferably within the range from about 30 to about 50° C. Optimum yields of a solid product relatively if not entirely free from color are obtained at reaction temperatures of from about 33 to about 42° C. and such temperatures are accordingly regarded as most advantageous.

The reaction mixture is maintained at the reaction temperature until the reaction is complete. This may require from one to about forty-eight hours, depending upon the reaction temperature and the reactants.

The aqueous reaction mixture must be alkaline for the condensation to proceed. The salicylamide and the benzoxazine dione are soluble in the alkaline medium but, as the reaction proceeds, the degree of alkalinity of the solution decreases (unless a reserve of undissolved base is present) due to the formation of hydrochloric acid, with the result that the benzoxazine dione begins to precipitate. Alkalinity is ensured by carrying out the reaction in the presence of an inorganic base, in an amount to maintain the initial pH of the reaction medium above about 8, and preferably above about 10, and sufficient also to neutralize the whole of the hydrochloric acid formed in the course of the total conversion of the precursor salicylamide to the desired end product. Any inorganic base can be employed. The term "base" encompasses the oxides, hydroxides, and basic salts. Sodium hydroxide, potassium hydroxide, lithium hydroxide, sodium carbonate, potassium carbonate, calcium carbonate, lithium carbonate, sodium bicarbonate, and potassium bicarbonate, can be employed. Preferably, the inorganic base is wholly soluble in the reaction medium in the amount required to ensure that the final pH of the reaction medium is not less than 7, so as to facilitate separation of the 1:3-benzoxazine-2:4-dione product from the reaction medium at conclusion of the reaction without contamination by the base. However, an insoluble inorganic base may be used provided any amount thereof remaining at the conclusion of the reaction will form a soluble salt on reaction with the acid or acids used in the final precipitation and/or washing steps.

It is desirable for better control of the reaction temperature to add the lower alkyl ester of chloroformic acid to the aqueous reaction mixture containing the salicylamide in suspension, dispersion or solution. The chloroformic acid ester is added with sufficient stirring to ensure a homogeneous reaction mixture, and at a rate slow enough to control the reaction temperature within the established range. The reaction is initially exothermic, and unless the chloroformic acid ester is added rather slowly, it may be necessary to apply external cooling. The addition of the chloroformic acid ester may require from one-half hour to three hours' time or longer, depending upon the relative volumes of the reaction mixture and chloroformic acid ester. After all of the chloroformic acid ester has been added, reaction is continued at the established temperature until formation of the 1:3-benzoxazine-2:4-dione is substantially complete.

The rate at which the chloroformic acid ester is added is of particular importance to the formation and precipitation of the benzoxazine dione in the most desirable granular, crystalline condition, but the optimum rate of addition that is applicable will depend on the circumstances of the particular reaction system, and will usually be determinable in that environment. The optimum rate is dependent on the reaction temperature, the physical characteristics of the reaction vessel, the efficiency of the agitator, and the size of the batch, and is determined by experimentation within the parameters of the available system. In general, it may be said that it is important to proceed slowly and cautiously with the addition during the initial stages of the reaction until a granular precipitation is observed to have commenced, whereafter the rate of addition becomes less critical.

The examples given hereinafter exemplify use of temperatures in the range from 35 to 45° C., a spherical vessel and a simple propeller stirrer, with the rate of addition of the alkyl chloroformate varying from ¼ mol per hour (or 25 ml. per hour) for a ¼ molar batch, to 25 mol per hour (2500 ml. per hour) for a 100 molar batch, and to 60 mol per hour for a 500 molar batch.

At the conclusion of the reaction, the precipitation of the 1:3-benzoxazine-2:4-dione is effected or completed by addition of an inorganic or organic acid to acidify the reaction medium and preferably bring the pH to below 6. It will then separate as a solid material. If it does not do so, as may occur in the case of an aqueous solvent medium, the mixture can be diluted with water.

The final product may be slightly pink in color. If so, it can be freed from its color by suspending it in an aqueous solution of an inorganic or organic acid, such as, for example, hydrochloric acid, sulfuric acid, phosphoric acid, acetic acid, formic acid, or propionic acid, for a short time, usually from one-half hour to five hours. The product can be suspended in an aqueous solution of the acid brought to a pH below 7, and preferably within the range from about 5 to about 6.

The acid treatment also can be effected in the reaction medium itself, prior to separation of the solid products therefrom. In this case, at the completion of the reaction, when the acid is added in a sufficient amount to bring the pH of the reaction medium to below 6, the benzoxazine dione product is held in the medium until the color has been destroyed. The 1:3-benzoxazine-2:4-dione can then be separated in the usual way by filtration or centrifuging, or other conventional techniques.

The final product is washed with water or alkaline bicarbonate solution until acid-free. Residual salicylamide can be removed by washing with a solvent for salicylamide, such as methanol. These are known solvents, so further details need not be given here. The product which is obtained is usually in crystalline granular form. It is in most instances sufficiently pure for use without further purification. If exceptional purity is desired, it can be recrystallized from an appropriate organic solvent mixture, such as ethyl acetate-hexane, methanol, ethanol, methyl Cellosolve, butanol, chloroform, dimethyl formamide, ethyl acetate, acetonitrile-ethyl acetate, pyridine-hexane, acetonitrile-ethyl ether, and dimethyl formamide-ethyl acetate.

The following examples in the opinion of the inventors represent preferred embodiments of the invention.

Example 1

Salicylamide (10 mols) was added to water (2 l.) and stirred into a slurry. Sodium hydroxide (10.5 mols) was dissolved in water (1 l.) and the resulting solution was filtered, cooled to 20° C. and then added to the slurry. The resulting mixture, whose pH was 13.5, was placed in a jacketed container fitted with a stirrer and with external cooling means. Ethyl chloroformate (10.5 mols) was added slowly to the mixture in the container, at a rate such that the temperature was maintained between 35 and 40° C., with stirring to maintain the mixture homogeneous. After three hours, the addition was complete, but the reaction mixture was kept at the same temperature for a further twenty-four hours.

The pH of the mixture was then adjusted to between 5 and 6 with dilute hydrochloric acid. 1:3-benzoxazine-2:4-dione was precipitated as a hard, crystalline but pink solid. The precipitate was filtered and dried. The precipitate was then slurried in water (10 l.) to which was added concentrated hydrochloric acid (400 ml.) to pH 5.5, in order to remove the pink color from the product. The slurry was then filtered, the precipitate washed with water until free from chloride ions and then with methanol (or industrial methylated spirits) until free from salicylamide, and finally dried. The 1:3-benzoxazine-2:4-dione obtained in this manner was a hard substantially colorless crystalline solid. The yield was 84%.

Example 2

Salicylamide (34.3 g.) was added to a stirred solution of potassium carbonate (19.2 g.) in water (100 ml.). The resulting slurry (pH 11.0) was warmed to 40° C., and ethyl chloroformate (25 ml.) was then added slowly over three hours, maintaining the temperature in the range of 35 to 40° C. The reaction mixture was then stirred for a total of twenty-four hours at this temperature. The pH of the mixture was then adjusted to between 5 and 6 by the careful addition of dilute hydrochloric acid. The hard solid benzoxazine dione and unreacted salicylamide precipitate was filtered out, and washed with distilled water until the washings were free from chloride ions. It was then washed with methanol until free from salicylamide, and finally dried in an oven at 90° C., to yield 34.8 g. of hard, crystalline off-white 1:3 benzoxazine-2:4-dione melting at 229–230° C., yield 85.4% of theoretical.

Example 3

Salicylamide (34.3 g.) was added to a stirred solution of sodium carbonate (15 g.) in water. The resulting slurry (pH 10.5) was warmed to 40° C. and ethyl chloroformate (25 ml.) was then added slowly over three hours while maintaining the temperature at 38–40° C. The reaction mixture was then stirred for twenty-four hours thoroughly with water (500 ml.). It was then washed at 38–40° C. The pH was then adjusted to between 5 and 6 by the careful addition of glacial acetic acid. The precipitated granular solid was filtered out and washed with methanol until free of unreacted salicylamide and finally dried for three hours at 90° C. to yield 31 g. (76%) of 1:3-benzoxazine-2:4-dione. A hard crystalline white granular solid was obtained.

Example 4

The process was carried out as in Example 3 except that potassium hydroxide (16 g.) replaced sodium carbonate (15 g.). The yield of white crystalline 1:3-benzoxazine-2:4-dione obtained was 28.4 g. (70%).

Example 5

Salicylamide (34.3 g.) was added to a stirred solution of sodium hydroxide (12 g.) in water (100 ml.). The resulting slurry (pH 12.5) was warmed to 40° C. and methyl chloroformate (25 g.) was then added slowly over three hours while maintaining the temperature in the range of 35–40° C. The reaction mixture was stirred for a total of twenty-four hours at this temperature. The pH of the mixture was then adjusted to between 5 and 6 by careful addition of dilute hydrochloric acid. A hard crystalline precipitate was formed. This was filtered out, and washed with distilled water until the washings were free from chloride ions. It was then washed with methanol until free from unreacted salicylamide and finally dried in an oven at 90° C., to yield 24.3 g. (60%) of crystalline pinkish-white 1:3-benzoxazine-2:4-dione.

Example 6

The process was carried out as in Example 5 except that sodium hydroxide (12 g.) was replaced by potassium carbonate (19.2 g.). The yield of white crystalline 1:3-benzoxazine-2:4-dione obtained was 25.2 g. (62%).

Examples 7 to 15

3-methyl-salicylamide (10 mols) was added to water (2 l.) and stirred into a slurry. Sodium hydroxide (10.5 mols) was dissolved in water (1 l.) and the resulting solution was filtered, cooled to 20° C. and then added to the slurry. The resulting mixture, whose pH was 13.5, was placed in a jacketed container fitted with a stirrer and with external cooling means. Ethyl chloroformate (10.5 mols) was added slowly to the mixture in the container, at a rate such that the temperature was maintained between 35 and 40° C., with stirring to maintain the mixture homogeneous. After three hours, the addition was complete, but the reaction mixture was kept at the same temperature for a further twenty-four hours.

The pH of the mixure was then adjusted to between 5 and 6 with dilute hydrochloric acid. 6-methyl-1:3-benzoxazine-2:4-dione was precipitated as a hard, crystalline but pink solid. The precipitate was filtered and dried. The precipitate was then slurried in water (10 l.) to which was added concentrated hydrochloric acid (400 ml.) to pH 5.5, in order to remove the pink color from the product. The slurry was then filtered, the precipitate washed with water until free from chloride ions and then with methanol (or industrial methylated spirits) until free from salicylamide, and finally dried. The 6-methyl-1:3-benzoxazine-2:4-dione obtained in this manner was a hard substantially colorless crystalline solid, melting point 238–240° C.

Using the same procedure, and starting with equivalent amounts of the appropriately substituted salicylamide, the following 1:3-benzoxazine-2:4-diones were produced, substituted in the aromatic nucleus as indicated, and having the melting points indicated:

| Example Number | Precursor Salicylamide | 1:3-benzoxazine-2:4-dione | Melting Point (° C.) |
|---|---|---|---|
| 7 | 3-methyl | 6-methyl | 238–240 |
| 8 | 4-methyl | 7-methyl | 239–241 |
| 9 | 5-methyl | 8-methyl | 209–212 |
| 10 | 4,5-dimethyl | 7,8-dimethyl | 227–230 |
| 11 | 4-t-butyl | 7-t-butyl | 125–127 |
| 12 | 3-chloro | 6-chloro | 279–280 |
| 13 | 3-bromo | 6-bromo | 284–286 |
| 14 | 3-phenyl | 6-phenyl | 258–259 |
| 15 | 5-phenyl | 8-phenyl | 232–233 |

Example 16

3-benzyl-salicylamide (5 mols) was added to a stirred solution of potassium carbonate (5.5 mols) in water (100 ml). The resulting slurry (pH 11.0) was warmed to 40° C., and ethyl chloroformate (5.5 mols) was then added slowly over three hours, maintaining the temperature in the range of 35 to 40° C. The reaction mixture was then stirred for a total of twenty-four hours at this temperature. The pH of the mixture was then adjusted to between 5 and 6 by the careful addition of dilute hydrochloric acid. The hard solid 6-benzyl-1:3-benzoxazine-2:4-dione and unreacted benzyl salicylamide precipitate was filtered out, and washed with distilled water until the washings were free from chloride ions. It was then washed with methanol until free from salicylamide, and finally dried in an oven at 90° C., to yield the hard, crystalline off-white 6-benzyl-1:3-benzoxazine-2:4-dione.

Example 17

3-ethoxy-salicylamide (2 mols) was added to a stirred solution of sodium carbonate (2.5 mols) in water. The resulting slurry (pH 10.5) was warmed to 40° C. and ethyl chloroformate (2.25 mols) was then added slowly over three hours, while maintaining the temperature at 38–40° C. The reaction mixture was then stirred for twenty-four hours at 38–40° C. The pH was then adjusted to between 5 and 6 by the careful addition of glacial acetic acid. The precipitated granular solid was filtered out and washed thoroughly with water (2 liters). It was then washed with methanol until free of unreacted 3-ethoxy-salicylamide, and finally dried for three hours at 90° C. to yield the 6-ethoxy-1:3-benzoxazine-2:4-dione. A hard crystalline white granular solid was obtained.

Example 18

(3′,4′-dimethyl-phenyl)-salicylamide (3 mols) was added to a stirred solution of sodium hydroxide (3.5 mols) in water (1 liter). The resulting slurry (pH 12.5) was warmed to 40° C. and methyl choroformate (3.5 mols) was then added slowly over three hours, while maintaining the temperature in the range of 35–40° C. The reaction mixture was stirred for a total of twenty-four hours at this temperature. The pH of the mixture was then adjusted to between 5 and 6 by careful addition of dilute hydrochloric acid. A hard crystalline precipitate was formed. This was filtered out, and washed with distilled water until the washings were free from chloride ions. It was then washed with methanol until free from unreacted 3-(3′,4′-dimethyl-phenyl)-salicylamide, and finally dried in an oven at 90° C., to yield crystalline pinkish-white 6-(3′,4′-dimethylphenyl)-1:3-benzoxazine-2:4-dione.

Example 19

4-cyclohexyl-salicylamide (1 mol) was added to a stirred solution of sodium hydroxide (1.25 mols) in water (500 ml.). The resulting slurry (pH 12.5) was warmed to 40° C. and methyl chloroformate (1.25 mols) was then added slowly over three hours, while maintaining the temperature in the range of 35–40° C. The reaction mixture was stirred for a total of twenty-four hours at this temperature. The pH of the mixture was then adjusted to between 5 and 6 by careful addition of dilute hydrochloric acid. A hard crystalline precipitate was formed. This was filtered out, and washed with distilled water until the washings were free from chloride ions. It was then washed with methanol until free from unreacted 4-cyclohexyl-salicylamide and finally dried in an oven at 90° C., to yield crystalline pinkish-white 7-cyclohexyl-1:3-benzoxazine-2:4-dione.

Having regard to the foregoing disclosure, the following is claimed as the inventive and patentable embodiments thereof:

1. A process for the preparation of a 1:3-benzoxazine-2:4-dione having the formula

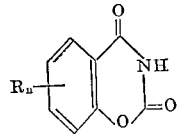

in which R is selected from the group consisting of halogen, lower alkyl, lower alkoxy, and aryl and mixed alkyl-aryl having from six to ten carbon atoms, and $n$ is an integer in which R is selected from the group consisting of halogen, lower alkyl, lower alkoxy, and aryl and mixed alkyl-aryl having from six to ten carbon atoms, and $n$ is an integer from zero to four, which comprises adding a lower alkyl ester of chloroformic acid at a slow rate and with stirring to ensure the formation of a solid product to an aqueous medium comprising water, a precursor salicylamide, and an inorganic base in an amount to bring the pH to above about 8; and holding the reaction mixture at a temperature within the range from about 20 to about 70° C. at which the reaction proceeds but below the decomposition temperature until the 1:3-benzoxazine-2:4-dione is formed.

2. A process in accordance with claim 1, in which the reaction is carried out at a temperature within the range from about 30 to about 50° C.

3. A process in accordance with claim 1, in which the chloroformic ester is ethyl chloroformate.

4. A process in accordance with claim 1, in which the chloroformic ester is methyl chloroformate.

5. A process in accordance with claim 1, in which the inorganic base is sodium hydroxide.

6. A process in accordance with claim 1, in which the inorganic base is potassium hydroxide.

7. A process in accordance with claim 1, in which the inorganic base is sodium carbonate.

8. A process in accordance with claim 1, in which the inorganic base is potassium carbonate.

9. A process in accordance with claim 1, which includes adding the chloroformic acid ester at a rate to maintain the temperature of the reaction within the stated range.

10. A process in accordance with claim 1, which includes suspending the 1:3-benzoxazine-2:4-dione product in an aqueous acid medium until it is decolorized.

11. A process in accordance with claim 10, in which the pH of the acid medium is within the range from about 5 to about 6.

12. A process in accordance with claim 10, which includes acidifying the reaction mixture at the conclusion of the reaction, and holding the resulting mixture until the 1:3-benzoxazine-2:4-dione product is decolorized.

13. A process in accordance with claim 10, in which the acid is hydrochloric acid.

14. A process in accordance with claim 10, in which the acid is acetic acid.

15. A process in accordance with claim 1, in which $n$ is zero.

16. A process in accordance with claim 1, in which $n$ is one.

17. A process for the preparation of 1:3-benzoxazine-2:4-dione which comprises adding a lower alkyl ester of chloroformic acid at a slow rate and with stirring to ensure the formation of a solid product to an aqueous medium comprising water, salicylamide, and an inorganic base in an amount to bring the pH to above about 8; and holding the reaction mixture at a temperature within the range from about 20 to about 70° C. at which the reaction proceeds but below the decomposition temperature until the 1:3-benzoxazine-2:4-dione is formed.

18. A process in accordance with claim 1, which includes suspending the 1:3-benzoxazine-2:4-dione in an aqueous acid medium having a pH below 6 until it is decolorized.

References Cited

UNITED STATES PATENTS 2,476,559  7/1949  Nawiasky et al. ----- 260—244
3,122,538  2/1964  Clauson-Kass et al. -- 260—244

OTHER REFERENCES

Einhorn et al., "Berichte," vol. 35, pp. 3647-53 (1902).

HENRY R. JILES, *Primary Examiner.*

WALTER A. MODANCE, *Examiner.*

R. T. BOND, *Assistant Examiner.*

UNITED STATES PATENT OFFICE
CERTIFICATE OF CORRECTION

Patent No. 3,409,615

November 5, 1968

John William James et al.

It is certified that error appears in the above identified patent and that said Letters Patent are hereby corrected as shown below:

Column 5, line 57, beginning with "thoroughly with" cancel all to and including "salicylamide and" in same column 5, line 64, and insert -- formate (25 ml.) was then added slowly over three hours while maintaining the temperature at 38-40° C. The reaction mixture was then stirred for twenty-four hours at 38-40° C. The pH was then adjusted to between 5 and 6 by the careful addition of glacial acetic acid. The precipitated granular solid was filtered out and washed thoroughly with water (500 ml.). It was then washed with methanol until free of unreacted salicylamide and --. Column 8, line 59, the claim reference numeral "1" should read -- 17 --.

Signed and sealed this 17th day of March 1970.

(SEAL)
Attest:

Edward M. Fletcher, Jr.
Attesting Officer

WILLIAM E. SCHUYLER, JR.
Commissioner of Patents